May 16, 1961      J. E. COPENHEFER      2,984,286
METHOD AND APPARATUS FOR MAKING FILAMENTOUS MAT

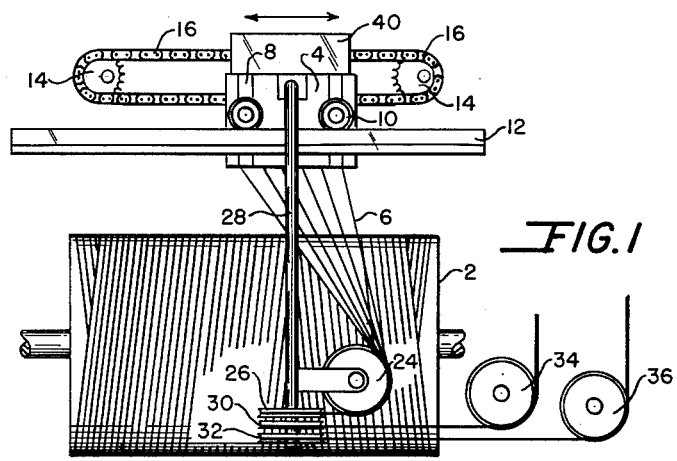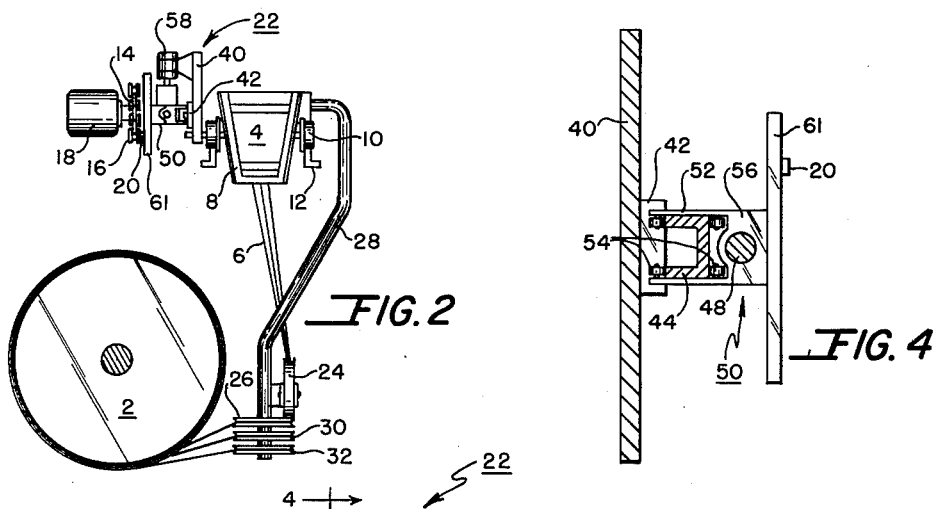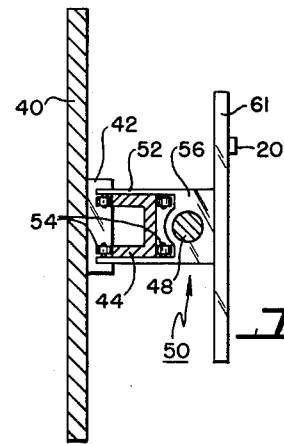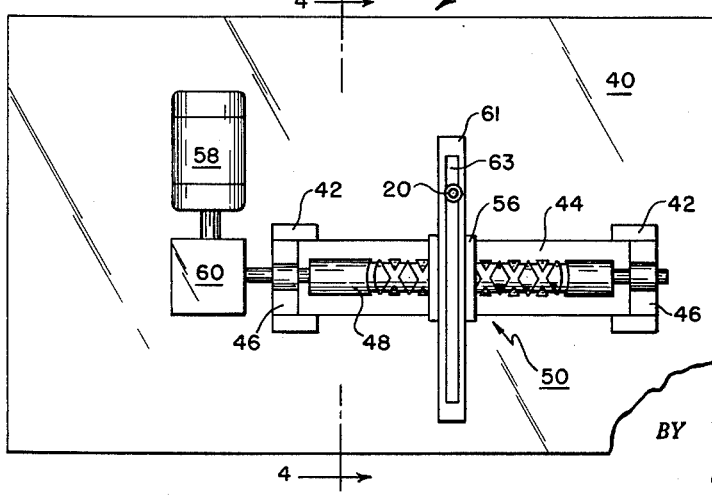

Filed Dec. 30, 1959      2 Sheets-Sheet 2

INVENTOR.
JOHN E. COPENHEFER
BY
*Edward C. Areny*
ATTORNEY

United States Patent Office 2,984,286
Patented May 16, 1961

2,984,286

METHOD AND APPARATUS FOR MAKING FILAMENTOUS MAT

John E. Copenhefer, Anchorage, Ky., assignor to American Air Filter Company, Inc., Louisville, Ky., a corporation of Delaware Filed Dec. 30, 1959, Ser. No. 862,924

8 Claims. (Cl. 154—1)

This invention relates to a method and apparatus for producing filamentous mats of glass fiber material.

One conventional method of making filamentous mats of glass fiber material includes the steps of: reciprocating a glass filament feeder axially along and between the ends of the drum; rotating the drum a multiplicity of times during each traverse of the feeder; feeding a plurality of continuous filaments, either individually or in collected form, or in both forms, from the feeder to the drum during successive traverses to build up or wind a cylindrical condensed mat having a corresponding succession of layers, each layer containing a multiplicity of continuous helical turns of the fed filaments, slitting the cylindrical condensed mat axially to remove it from the drum and to provide a planar condensed mat; stretching the condensed mat axially (i.e., in a direction transverse to the general lay of the filaments) to provide an elongate web; applying a binder or the like to and compressing the thickness of the elongate web to provide an elongate flat web; and treating the flat web to set the binder and form the finished mat material.

Such filamentous mats may be used to reinforce and/or decorate plastic sheet material, or as an air filtering material, or for other purposes depending upon the particular character of the finished mat.

So far as known, conventional practice during the stretching operation is to stretch and treat each planar condensed mat separately and individually. The leading and trailing ends may be trimmed before or after stretching to the extent deemed necessary and discarded as waste, this waste material corresponding to the circumferential end area of the condensed mat as spun on the drum. Since the planar condensed mat of say 12 feet long by 6 feet wide may be stretched 30 to 50 times its width, a relatively small circumferential end area on the drum may constitute a rather extensive area of stretched mat. Further, if a mat as stretched does not give a desired total length, stretched mat material derived from a separate condensed mat is connected thereto. This connecting joint often constitutes a sufficient imperfection for subsequent users of the mat that it must be watched for and avoided in the processing operation. While Jackson U.S. Patent No. 2,798,531 issued July 9, 1957, discloses a method which appreciably reduces the end area waste for certain spinning practices, it does not entirely eliminate such waste.

Therefore, one object of this invention is to provide a method which further minimizes, if it does not completely eliminate, such end or edge area waste material.

Another object is to provide a method for obtaining from two or more individual and separately formed condensed mats a finished mat of unbroken and continuous character.

Another object is to provide a method affording manufacturing economies in several respects.

Another object is to provide apparatus for practicing the inventive method in connection with various spinning techniques.

In practicing the invention, the deposition of filamentous material on the drum is controlled to provide an outwardly directed taper or sloping of the condensed mat in the circumferential end areas. This controlled deposition may be effected in various ways depending upon the manner in which the material is fed to the drum. Thus, if the major portion of the material is being fed in the form of collected cords formed of gathered individual filaments and the cords are fed to the drum in closely spaced relation, the traversing path of the filament feeder is progressively shifted axially in one direction and then in the other, to form the tapered circumferential ends of the package being built up on the drum. If substantially all of the material is being fed to the drum as individual fibers with a substantial distance in an axial direction between the end fibers, the fibers will inherently build up a condensed mat which has a taper at each of the end reversal areas. However, progressive axial shifting of the traversing path of the filament feeder may also be desirable under these latter circumstances for obtaining an elongated taper in the end areas of such a condensed mat.

The cylindrical condensed mat having the tapered ends is slit axially and removed from the drum to provide a planar condensed mat. The condensed mat is positioned to be stretched in a direction transverse to the general lay of the filaments and a similarly formed planar condensed mat also having tapered marginal edges is similarly positioned. As the stretching operation on the first mat begins to draw the tapered trailing edge of the first mat from the table supporting the first mat the tapered leading edge of the second mat is begun to be stretched and is placed so that the complementary and mating tapered edge areas of the two mats are simultaneously stretched and treated to form an elongate finished mat of unbroken character.

The invention is illustrated in the accompanying drawing by way of example, and wherein:

Figure 1 is a somewhat diagrammatic front elevational view of apparatus for winding a cylindrical condensed mat from a plurality of collected cords of filaments;

Figure 2 is a partly broken end elevational view of the apparatus of Figure 1 and showing an auxiliary traversing mechanism interposed between the main traversing drive arrangement and the filament feeder;

Figure 3 is a rear elevational view of the auxiliary traversing mechanism;

Figure 4 is a vertical sectional view taken along the line 4—4 of Figure 3;

Figure 5:
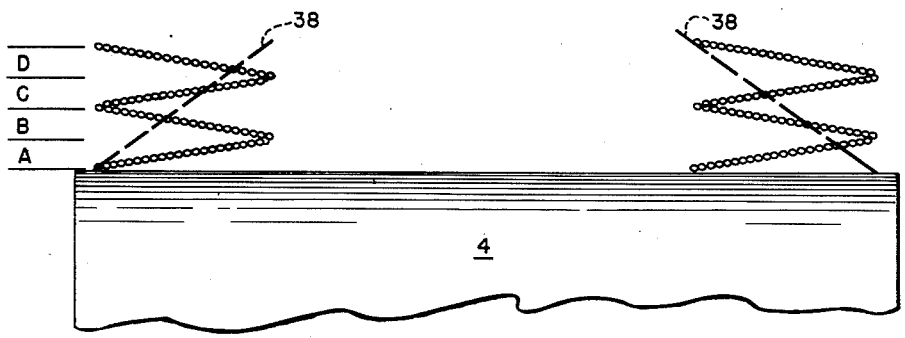
Figure 5 is a fragmentary diagrammatic view illustrating an exaggerated profile of the end areas of one condensed mat formed in accordance with the invention; and, Figure 6 is a diagrammatic side elevational view of apparatus for stretching and treating condensed mats to form elongate finished mats.

Apparatus for practicing the invention in connection with one particular spinning technique wherein collected glass filament cords formed of many individual filaments are fed onto the drum includes: a suitably supported drum 2 adapted to be rotated at a predetermined speed; one glass furnace 4 from which individual and continuous glass filaments 6 are drawn or attenuated by the rotating drum; means supporting the furnace for reciprocating movement in a path above and between ends of the drum, such means including a framework 8 in which the furnace is carried, and rollers 10 connected to the framework and riding on spaced rails 12; main traversing drive means such as horizontally spaced sprockets 14 carrying an endless chain 16, one of the sprockets being driven by an electric motor 18; means for transferring the main traversing drive force to the furnace framework 8 and other reciprocating elements, such drive transfer means including a pin 20 carried by one of the links of the endless chain and engaging the auxiliary traversing drive means generally designated 22; means for collecting the single filaments from the traversing furnace 4 and feeding such collected cords onto the rotating drum, such means including a gathering wheel 24 and feeding wheel 26 carried by rod 28 depending from, and moveable with, the furnace carriage or framework; and means for feeding collected cords of glass filaments from sources other than the traversing furnace 4, such means including feeding wheels 30 and 32 also carried by rod 28, and receiving collected cords from gathering wheels 34 and 36 respectively. The source of the filaments fed to wheels 34 and 36 may be stationarily positioned furnaces or spools upon which such collected cords have previously been wound. With the exception of the auxiliary traversing mechanism 22 and its relationship with the other parts, the apparatus thus far described is conventional and will not be explained in detail.

With such conventional apparatus, as well as with the apparatus of the present invention, the furnace and other drum traversing elements are driven back and forth as indicataed by the double-headed arrow of Figure 1 at say 3 round trip traverses per minute while the drum 2 is rotated a multiplicity of times during each traverse. The single filaments 6 drawn from the traversing furnace pass around the collecting wheel 24 and then around the feeding wheel 26 to the drum in the form of a collected cord of filaments. The additional collected cords are fed around the wheels 30 and 32 to the drum. If desired some or all of the individual filaments 6 descending from the traversing furnace may be fed directly to the drum without being collected into a cord, this arrangement being disclosed in Jackson U.S. patent application Serial No. 621,907 filed November 13, 1956. As the traversing assembly moves along the drum in one direction and then the opposite direction, the cords and/or individual filaments will be wound on the drum in helical turns directed first one way and then the other way. Thus the cylindrical condensed mat built up on the drum is formed of a plurality of layers, each layer being composed of cords, or cords and individual filaments, lying at a crossing angle with respect to each adjacent layer.

To insure that each circumferential end area of the cylindrical condensed mat built up on the drum has an outwardly directed taper when the major portion of the material is being wound on the drum as several closely spaced multi-filament strands, the auxiliary traversing mechanism generally designated 22 is interposed between the main traversing drive means and the driven assembly of traversing furnace and filament handling wheels. This auxiliary traversing mechanism 22 serves to progressively shift the traversing path of the traversing assembly relative to the drum, first in one axial direction and then in the opposite axial direction, so that upon successive round trip traverses of the traversing assembly the opposite end reversing points of the assembly are offset slightly in an axial direction from each preceding round trip traverse of the assembly. In other words, assuming that at first the auxiliary traversing mechanism is shifting the traversing path to the right relative to the drum as viewed in Figure 1, then each time the traversing assembly reaches its end reversal point near the right end of the drum, the material is wound on the drum slightly farther to the right than the extreme right hand material wound on the drum during the preceding traverse. The material being wound near the left end of the drum during the shift to the right of the traversing path is of course also being wound slightly to the right of the material wound on the preceding traverse. A portion of a condensed mat built up by the progressive shifting of the traversing path in one direction and then the other direction is illustrated in exaggerated profile in Figure 5 wherein the thickness of the mat built up during the first series of shifts to the right is indicated by the letter A, the thickness of the mat built up during the first series of shifts to the left is indicated by the letter B, the second series to the right by the letter C and the second series to the left by the letter D. While for illustration purposes the end area profiles are shown as being built up in a manner having most of the material forming the tapered edges of the mat being unsupported, such lack of support results in such material winding on previously wound material to form the taper patterns indicated, in exaggerated fashion, by the dotted lines 38.

The auxiliary traversing mechanism includes a plate 40 which is rigidly attached to the traversing furnace carriage, one surface of the plate having secured thereto a pair of horizontally spaced support blocks 42 carrying opposite ends of horizontal channel member 44, with the flanges of the channel directed towards but spaced from the plate. At each end of the channel, and on the bight side thereof, a bearing block 46 is mounted in which the opposite end spindles of the cylinder 48 are journalled. The cylinder is provided with right hand and left hand helical grooves over a portion of its length so that in appearance it is similar to a so-called "level wind" shaft commonly found on fishing bait casting reels. A follower assembly carriage 50 riding on the channel includes a pair of legs 52 extending along the outside of the channel flanges and movably mounted on the channel by means of wheels 54 riding on opposite surfaces of the channel, and a follower block 56 having an interior element projecting into the grooves on the cylinder. As the cylinder 48 is continuously rotated in one direction by suitable means such as electric motor 58 driving gear reducer 60, the follower assembly carriage moves axially back and forth along the cylinder at a rate of say, 1 round trip traverse every 3½ minutes. The follower assembly has secured thereto a vertical bracket 61 with an elongated slot 63 in which rides the pin 20 hereinbefore mentioned as being secured to one of the links of the endless chain 16. Thus the circular path which the pin link follows around the sprockets at the end of each traverse can be accommodated by the pin moving up or down in the slot.

With the described arrangement, the final end or reversal position of the traversing assembly relative to the drum for each traverse is determined, in part, by the position of the follower assembly 50 on the cylinder 48. If the drive chain 16 is driven by eccentrically mounted sprockets as disclosed in the noted Jackson Patent 2,798,531, the end travel position of the traversing assembly relative to the drum will also be affected by the varying end travel position inherent with such a drive arrangement. When using the eccentrically mounted sprocket arrangement combined with the auxiliary traversing mechanism, the tapered end area at each end of the drum will extend axially along the drum a distance equal to the total traversing distance of the follower assembly 50 along the cylinder 48 plus twice the eccentricity or throw of the eccentric sprockets. Thus, for example, if the eccentricity of the sprockets is 1¾ inches and the total traversing distance of the follower assembly 50 along the cylinder 48 is 8 inches, the length of taper at each end of the drum will be 11½ inches.

If the sprockets 14 are concentrically mounted, the length of taper at each end of the drum will be equal to the traversing distance of the follower assembly along the cylinder. When individual filaments are spun directly onto the drum from several axially extending rows of traversing furnace orifices, the length of taper at each end of the drum will be equal to the orifice row length plus follower assembly traversing distance.

It will be noted that with a sprocket and chain drive arrangement, that as the driven traversing assembly approaches its end travel position and consequently de-accelerates, stops and then accelerates in the opposite direction as the connecting link moves through a circular path around a sprocket in reversing its axial direction, that during this period the end area of the drum receiving material receives more material than a correspondingly sized central drum area which receives material while the traversing assembly moves at a higher speed. While the excess winding material does fall within the end area tapers, in practice such excess windings in these areas have not been objectionable since they comprise a relatively small proportion of the total material of the condensed mat and have not been objectionably discernible in the finished stretched mat. It is further noted that with the combination of eccentrically mounted sprocket drive arrangement and auxiliary traversing mechanism, such excess windings are sufficiently distributed over the tapered end areas to minimize the problems attendant thereto.

When so-called flat mats of the reinforcing or decorative type are being produced, the filaments are collected on the drum in a dry state, i.e., no lubricant or binder is applied to the material during the spinning process. After a desired thickness of cylindrical condensed mat is formed on the drum, the mat is slit axially, removed from the drum, and laid on a flat surface to provide a planar condensed mat.

Figure 6:
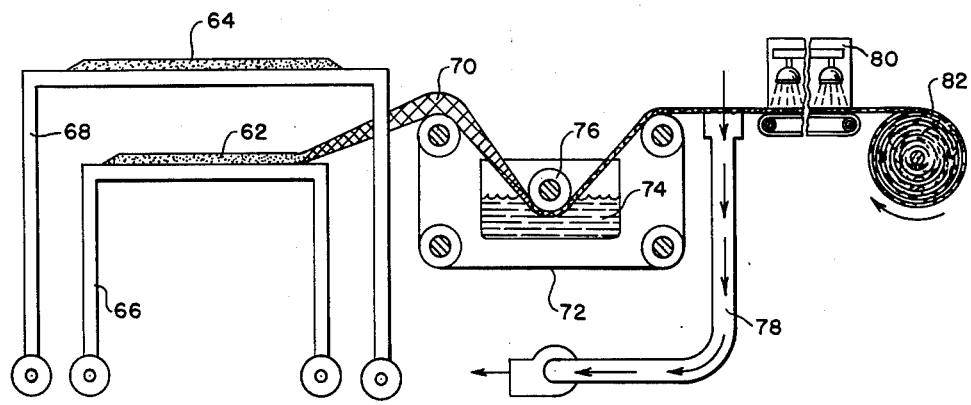

Such a planar condensed mat, indicated by 62 in Figure 6, and a similarly formed planar condensed mat 64, are positioned on supporting tables 66 and 68 respectively, with the filaments and cords forming the condensed mats extending generally transverse to the direction in which the mats are to be stretched.

These mats are then successively processed by stretching or elongating them axially (in a direction transverse to the general lay of the filaments) to form an elongate and expanded thickness web as indicated at 70, passing the expanded thickness web on endless conveyor 72 into a receptacle containing a treating liquid 74 such as a binder, flattening the web with roller 76, passing the flattened web or mat over suction device 78 which removes excess liquid, passing the elongated flat mat through oven 80 where the liquid on the web is treated, and then winding the finished flat mat into a suitable roll 82.

In carrying out the invention, as the material forming the thickest portion of the trailing tapered area of the first condensed mat 62 is begun to be advanced or stretched forwardly, the material forming the thinnest or extreme leading edge of the leading tapered area of the second condensed mat 64 is simultaneously advanced and overlapped thereon in complementary relation. Thus as the trailing taper of the first mat is being stretched and treated, the leading taper of the second mat is being stretched and treated simultaneously therewith to form a composite mat area having a thickness and visual characteristics essentially the same as that of a mat area from a central portion of either mat. When the major portion of the second condensed mat 64 has been stretched, a third condensed mat occupying a position such as mat 62 is shown to occupy may be begun to be stretched by advancing its extreme leading edge simultaneously with the advance of the beginning of the trailing tapered area of mat 64, and underlapping such extreme leading edge in mating relation with the tapered area of mat 64. The conveyor 72 and advancing expanded thickness web 70 mutually engage such leading edge and continue the advance of successive incremental portions of the lower mat. It is noted that economy in handling of the condensed mats is effected by laying a series of mats, one upon the other and separated by a paper sheet, on each of the tables 66 and 68. Thus mats from alternate tables may be successively processed to continually form an unbroken mat which may be wound into rolls of any length deemed most desirable.

To facilitate accurate mating of the complementary tapers, the beginning or thickest portion of a trailing taper may be readily determined by measuring the known taper distance from the extreme trailing edge of the condensed mat. A relatively light weight stick or other marker there placed will be observably displaced when the filaments underlying it begin their advance, and the leading edge filaments of the succeeding mat may then be advanced simultaneously and properly placed.

The invention claimed is:

1. A method of making a filamentous mat comprising: forming a first planar condensed mat of a plurality of layers of generally longitudinally extending filaments with the filaments forming adjacent layers lying in crossing relationship, and with the opposite marginal edges parallelling said filaments each having an outwardly directed taper; forming a second planar condensed mat of substantially similar character; positioning said first and second condensed mats in generally parallel relationship and in a position for stretching said condensed mats in a direction generally transverse to the general lay of said filaments; stretching said first mat in said direction; and simultaneously stretching, and joining in mating relationship, the leading taper of said second condensed mat and the trailing taper of said first condensed mat; and then continuing the stretching of said second condensed mat to form an elongate, unbroken mat including said first and second mats and having an intermediate mat area comprised of a composite of said mat tapers.

2. A method of making a finished, elongate mat of unbroken character comprising: winding a plurality of cylindrical condensed mats, each formed of a plurality of layers with filaments of adjacent layers lying in crossing relationship, and with the circumferential end areas of said mats being outwardly tapered; axially slitting said mats to form planar condensed mats therefrom; positioning at least two of said planar condensed mats in spaced apart and generally parallel relationship for stretching in a direction at right angles to the general lay of the filaments forming said planar condensed mats; stretching one of said mats in said direction until the trailing tapered area of said one mat begins to stretch; and then stretching the leading tapered area of another of said mats simultaneously with said trailing tapered area and feeding said leading and trailing tapered areas in complementary relationship through a treating zone.

3. A method of making a filamentous mat comprising: transversely reciprocating a filament feeder assembly axially back and forth along a drum; rotating the drum a multiplicity of times during each traverse of the feeder; feeding filamentous material from the feeder assembly to the drum during successive traverses to build up a cylindrical condensed mat composed of a corresponding succession of layers with each layer containing a multiplicity of helical turns extending continuously through a central area from one end reversal area to another; progressively shifting the end reversal points of said filament feeder relative to the drum in one axial direction and then in the opposite axial direction during a first and second series of successive traverses respectively to form, at both circumferential ends of said mat, an outwardly directed taper; forming additional cylindrical condensed mats of substantially the same character; axially slitting said condensed mats and removing them from said drums to form planar condensed mats; positioning at least two of said planar condensed mats in generally parallel relationship and in a position for stretching said planar condensed mats in a direction transveres to the general lay of said filamentous material; stretching the major and leading portion of one of said mats in said direction; and then simultaneously streching, and joining in complementary relationship, the trailing taper of said one condensed mat and the leading taper of a said additional mat; and then continuing the stretching of said additional mat to form an elongate, unbroken mat including said one mat and said additional mat.

4. The method of claim 3 including: gathering at least the major portion of said filamentous material into at least one strand before feeding said material to said drum; feeding said one strand and any additional strands to said drum in closely spaced relation.

5. The method of claim 3 including: varying the transverse speed of the feeder assembly during each traverse through said central area.

6. A method of making an elongate, unbroken filamentous mat from a plurality of separate planar condensed mats comprising: positioning, in vertically spaced relationship, two separate stacks of planar condensed mats adjacent mat processing apparatus, each stack comprising a plurality of vertically separated mats lying generally parallel, each condensed mat comprising a plurality of layers of filaments with filaments of adjacent layers lying in crossing relationship, and having a tapered leading and trailing area paralleling the general lay of said filaments; alternately stretching in a direction transverse to the general lay of said filaments, and passing into said processing apparatus, the top mat of one of said stacks and then the top mat of the other of said stacks; and during said stretching and passing operation, stretching the leading tapered area of each succeeding mat simultaneously with the trailing tapered area of each preceding mat, and joining said tapered areas in complementary relationship so that said tapered areas are passed through said processing apparatus together and in said complementary relationship.

7. Apparatus for making a cylindrical condensed filamentous mat comprising: a drum adapted to be rotated for presenting on its circumference a continuous filament receiving surface; a filament feeder supported for movement in a reciprocating path axially along and between the ends of said drum adjacent said drum surface; primary drive means for driving said filament feeder along said reciprocating path; auxiliary drive means for progressing shifting, first in one axial direction and then in the opposite axial direction, the reciprocating path of said feeder relative to said drum.

8. The apparatus of claim 7 wherein: said auxiliary drive means is disposed intermediate said primary drive means and said filament feeder; first connecting means connecting said primary drive means to said auxiliary drive means are provided; second connecting means connecting said auxiliary drive means to said filament feeder are provided; and said auxiliary drive means includes means for displacing said first connecting means relative to said second connecting means in said one and said opposite axial directions.

References Cited in the file of this patent
UNITED STATES PATENTS

| | | |
|---|---|---|
| 2,350,861 | Argy et al. | June 6, 1944 |
| 2,431,035 | Grepfert et al. | Nov. 18, 1947 |
| 2,656,873 | Stephens | Oct. 27, 1953 |
| 2,664,375 | Slayter | Dec. 29, 1953 |
| 2,862,541 | Brink | Dec. 2, 1958 |